Feb. 15, 1955     E. F. KATZENBERGER     2,702,171
FLOTATION UNDERCARRIAGE FOR ROTARY WING AIRCRAFT
Filed Aug. 18, 1951     3 Sheets-Sheet 1

Inventor
E. F. KATZENBERGER

Attorney

Feb. 15, 1955  E. F. KATZENBERGER  2,702,171
FLOTATION UNDERCARRIAGE FOR ROTARY WING AIRCRAFT
Filed Aug. 18, 1951  3 Sheets-Sheet 2
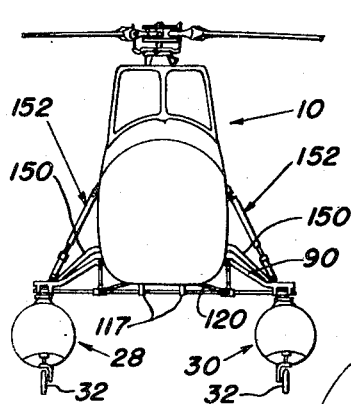
Fig. 6
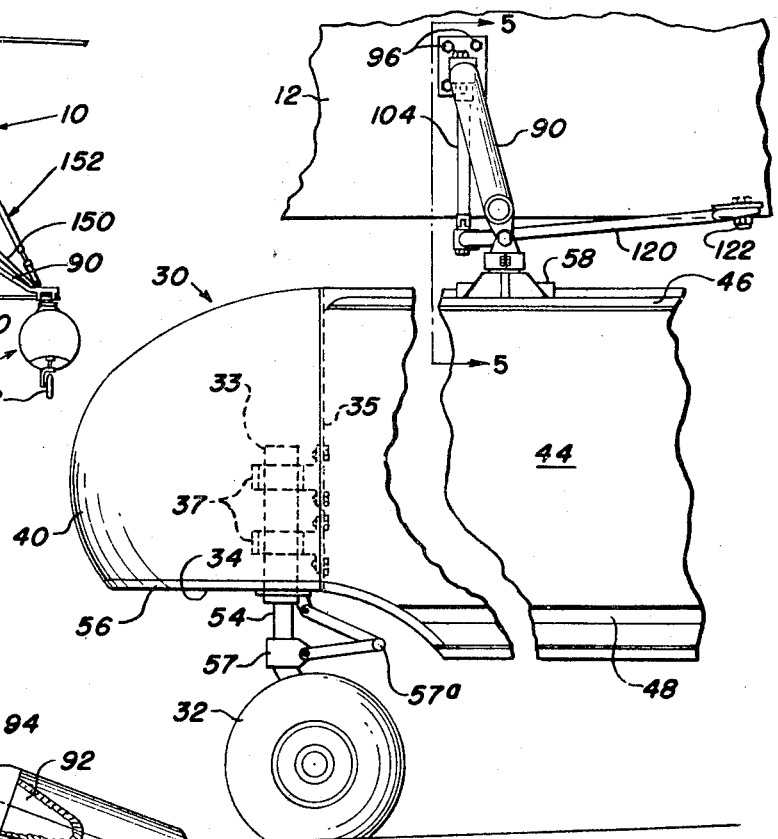
Fig. 4
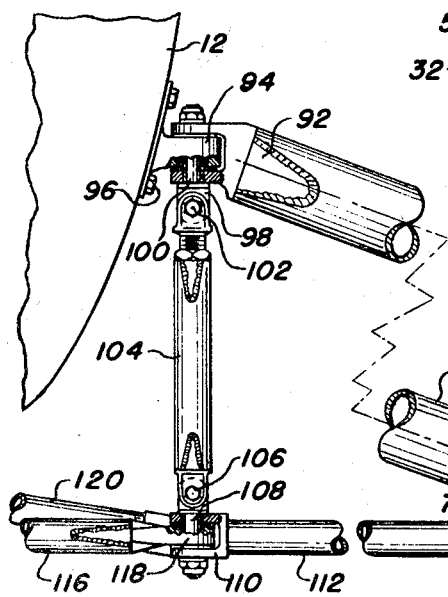
Fig. 5
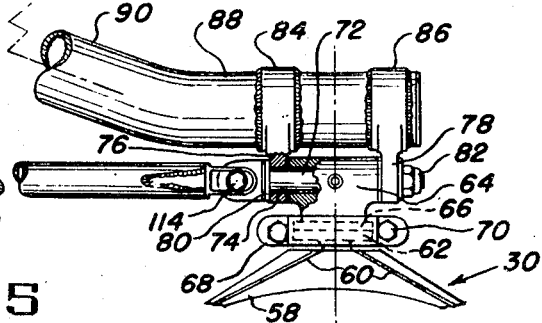
Inventor
E. F. KATZENBERGER
By M. B. Tasker
Attorney

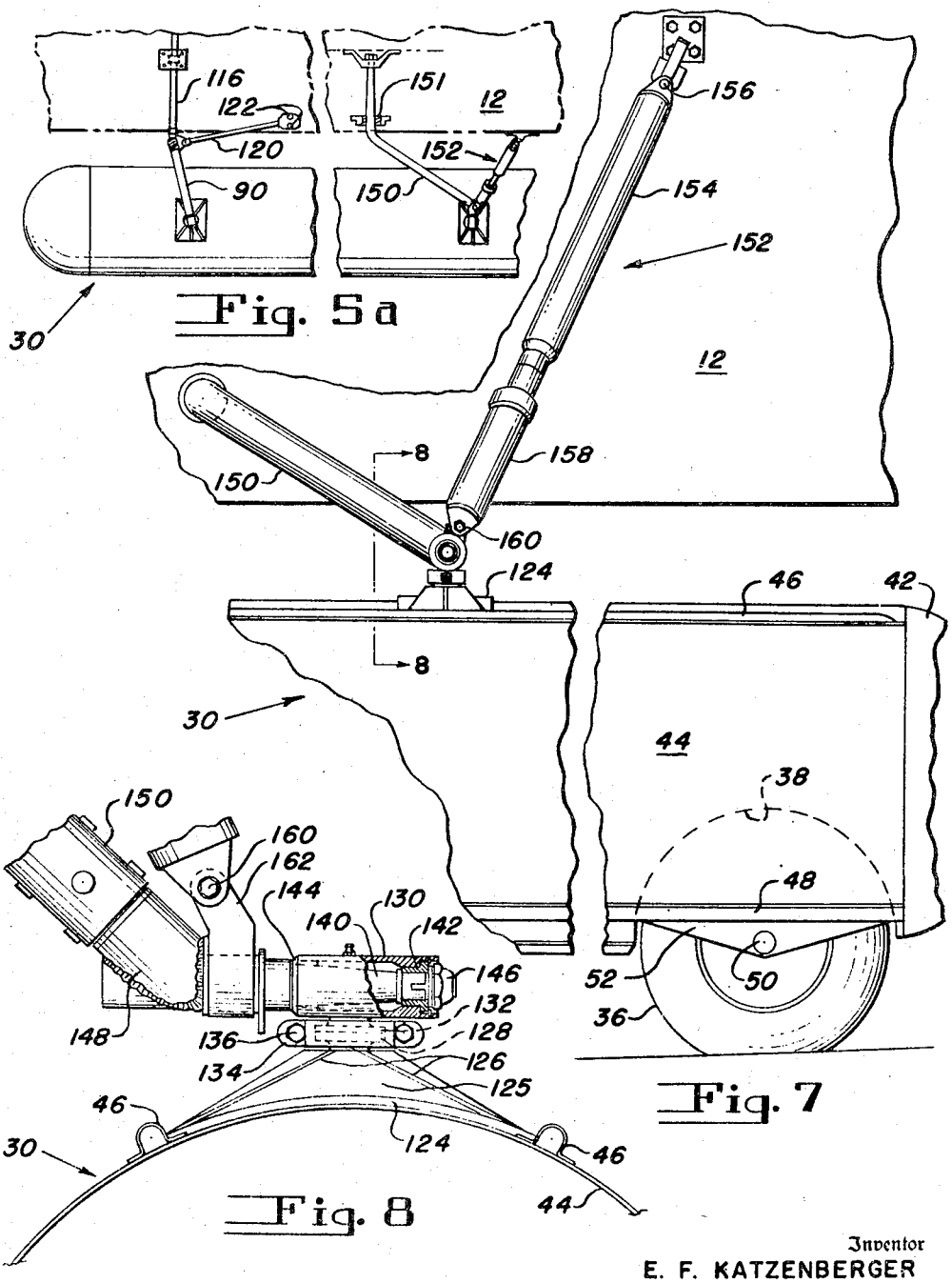

United States Patent Office 2,702,171
Patented Feb. 15, 1955

2,702,171

FLOTATION UNDERCARRIAGE FOR ROTARY WING AIRCRAFT

Edward F. Katzenberger, Bridgeport, Conn., assignor to United Aircraft Corporation, East Hartford, Conn., a corporation of Delaware Application August 18, 1951, Serial No. 242,455

3 Claims. (Cl. 244—17.17)

This invention relates to an improved amphibious undercarriage for rotary wing aircraft.

An object of the invention is to provide an improved undercarriage of the combined flotation cell and wheel type for direct lift aircraft.

A principal object of the invention is to provide an undercarriage of this type having improved means for supporting the flotation cells from the body of the aircraft which reduces the float drag in forward flight.

Another object of the invention is to provide an improved mounting structure for the flotation cells of such aircraft which absorbs the swells when the aircraft is resting on rough water and also enables the aircraft to land and take off more easily in choppy water.

Still another object is to provide a float or amphibious type gear which is readily interchangeable with straight wheel type gear.

A further object of the invention is generally to improve the construction and operation of amphibious aircraft.

These and other objects of the invention will be evident or will be pointed out in connection with the following description of an improved embodiment of the invention shown in the accompanying drawings.

In these drawings:

Fig. 4 is an enlarged detailed view, with parts broken away, showing the forward cell mounting structure in side elevation.

Fig. 5 is a still further enlarged view taken on line 5—5 of Fig. 4.

Fig. 5a is a detail plan view of one cell, with parts broken away, and its mounting structure.

Fig. 6 is a front view of the helicopter.

Fig. 7 is an enlarged detail view of a rear cell mounting structure, parts being broken away to facilitate illustration.

Fig. 8 is a view on line 8—8 of Fig. 7 on an enlarged scale.

Figure 1:
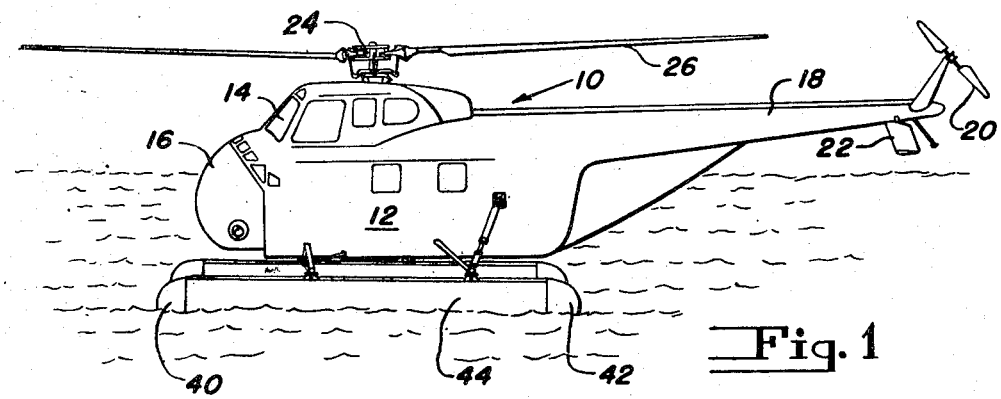
Fig. 1 shows a helicopter equipped with the improved amphibious undercarriage of this invention as the latter appears when the helicopter is at rest on the water.

The invention has been illustrated in connection with a single sustaining rotor helicopter although it is equally applicable to any direct lift aircraft. As herein shown, the helicopter includes a fuselage or body portion 10 which encloses a passenger or cargo compartment 12, a pilot compartment 14 and an engine compartment 16. The body also includes a tail cone 18 on the aft end of which is supported an anti-torque rotor 20 and stabilizing surfaces 22. The main lift rotor includes the usual rotor head 24 and a plurality of rotor blades 26.

The helicopter undercarriage, with which this invention is particularly concerned, includes a pair of side by side flotation cells 28 and 30 which are identical and interchangeable. Each cell carries a swiveled nose wheel 32 mounted in a front bottom recess 34 and a rear non-swiveled wheel 36 mounted in a bottom recess 38. The wheels 32 and 36 are so mounted that they project below the bottom of the cells a sufficient distance to constitute ground engaging members when it is desired to land on the ground or to move the helicopter along the ground while being sufficiently shrouded to reduce the drag when the helicopter is in forward flight.

Although fabric bag-type floats could be used, in the preferred modification, the cells 28 and 30 are of the rigid type including front and rear end caps, or headers, 40 and 42 and an intermediate generally cylindrical sheet metal tank section 44 having upper and lower longitudinally extended reinforcing rails 46 and 48. The aft wheels 36 are supported on axles 50 which extend through brackets 52 carried by the lower rails 48. The front wheels 32 are mounted on shock struts 33 which are swiveled in the bearings 37 carried by bulkhead 35. The depending portion of the shock strut, post 54, is prevented from excessive movement and is made to rotate with the main body of the shock strut by scissors 57a.

The flotation cells above described are mounted on the body of the helicopter by left and right forward and aft mounts which are identical for the two cells. Accordingly, only the forward and aft mounts for the port cell 30 will be described. The front mount is shown most clearly in Figs. 4 and 5. As shown in these figures an arcuate pad 58 rests on the top of the intermediate cell structure 44 between the rails 46. This pad has upstanding therefrom a dome-shaped member including oblique ribs 60 which converge into a circular pad 62. A horizontal journal member 64 has a similar pad 66 which rests upon pad 62, the two pads being held pivotally in abutting relation by a split collar 68 which is clamped about these pads by through bolts 70 which extend through suitable ears on the collar parts. A horizontal spindle 72 is journalled in the journal 64 on a bearing sleeve 74 which extends through journal 64 and through a pair of depending ears 76 and 78 which receive the journal 64 therebetween. This assembly abuts a shoulder 80 on the spindle and is held thereagainst by a nut 82 threaded onto the end of the spindle. The ears 76 and 78 are integral with attaching rings 84 and 86 which are welded to horizontal portion 88 of an oblique tubular frame member 90, the inboard end of which has a fitting 92 received therein and permanently welded thereto. The fitting 92 has a bifurcated end portion which receives a horizontal ear 94 of an attaching bracket which is secured to the fuselage by cap screws 96.

A fitting 98 has a vertical eye bolt 100 which extends through the bifurcated end of fitting 92 and the ear 94 and has a lug which is connected at 102 with a vertical strut member 104, the lower end of which is connected at 106 to a lug on another eye bolt 108 which is in vertical alignment with eye bolt 100 and together they form the pivot for the forward float mounting. The bolt 108 extends through the bifurcated ends 110 of a horizontal link 112, the outboard end of which link is connected by bolt 114 to a lug integral with the spindle 72. A connecting link 116 is proided between bolt 108 and the fuselage of the ship. To this end the outboard end of link 116 has an ear 118 which is received between the furcations 110 and is connected to the latter pivotally by the bolt 108. Link 116 is secured to the fuselage structure at 117, as is shown most clearly in Fig. 6. The bolt 108 also secures one end of an inwardly and rearwardly directed strut 120 which is connected at its remote end by bolts 122 with the helicopter body as shown in Fig. 4. From the above it will be evident that the forward end of the float is pivotally mounted on the horizontal spindle 72 at a point well back from the forward end cap 40 of the float, thus permitting movement of the float about the spindle 72 in a vertical plane including the longitudinal axis of the float. It will also be evident that the links 116 and 104 and strut 120 together with the fuselage provide a rigid support for the frame which supports journal 64 and that the latter can move about aligned pivot bolts 100 and 108 to accommodate the fore and aft movement of the float required by the movement of the after mounting struts.

The float is mounted adjacent its aft end on oleo strut and landing gear structure shown most clearly in Figs. 7 and 8. This is the same oleo strut and landing gear structure shown and claimed in my application Serial No. 161,630, filed May 6, 1950, now Patent No. 2,691,496, and assigned to the same assignee as the present application. As it is only necessary to remove the wheels and brakes from this gear, it is easily adaptable and readily interchangeable with the float installation.

A mounting pad similar to that previously described for the front mounting structure but adapted to fit the wheel axle is provided for the rear mounting structure. The pad 124 overlies the intermediate float structure 44 between the longitudinal rails 46 and includes the dome-shaped member 125 and converging frame members 126 which terminate in a circular pad 128. A horizontal journal member 130 carries a similar pad 132 which rests on pad 128 and the two pads are clamped together by complemental cuff members 134 having suitable ears through which clamping bolts 136 extend. Sufficient clearance is provided to allow pad 132 to rotate relative to pad 128. A horizontal spindle 140, formerly the wheel axle, is journalled in bearings, one of which is shown at 142, in the journal housing 130, a shoulder 144 being provided on the spindle which engages one side of the journal housing and is held thereagainst by a nut 146 threaded onto the end of the spindle. The inboard end of spindle 140 is welded to a fitting 148 in the end of an arm 150 which extends obliquely forward toward the helicopter body (viewed best in Fig. 5a) and is journalled therein in suitable bearings 151 on an angularly extended horizontal portion which extends into the fuselage body. It will thus be evident that vertical movements of the float in the plane of its longitudinal centerline are permitted as the angular extension of arm 150 moves on its bearings. These movements in the vertical plane are controlled by an oleo strut generally indicated at 152 which consists of a piston element 154 having a pivotal connection 156 at its upper end to fixed structure of the aircraft body and a cylinder element 158 adapted to contain hydraulic fluid and having a pivotal connection at 160 to an ear 162 carried by and rigidly connected to the spindle 140. Thus, when the oleo strut absorbs the weight of the strip or any shocks due to landing, member 150 rotates in the vertical plane around its journals. Besides the vertical motion of the float accommodated by the horizontal pivot of the forward mounting, it will also move in the fore-aft direction which is accommodated by the vertical pivot of the forward mounting. Lateral or side movements of the floats tending to scuff the tires are, however, entirely eliminated.

Figure 2:
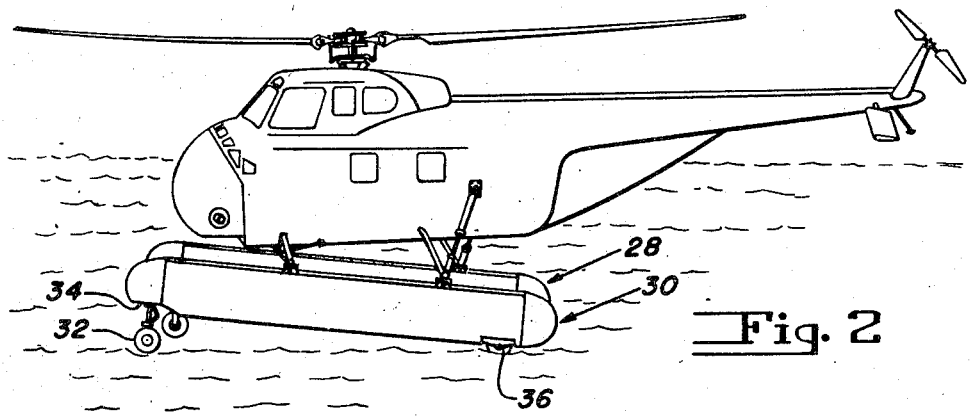
Fig. 2 shows the helicopter at the instant of landing on the water.
Figure 3:
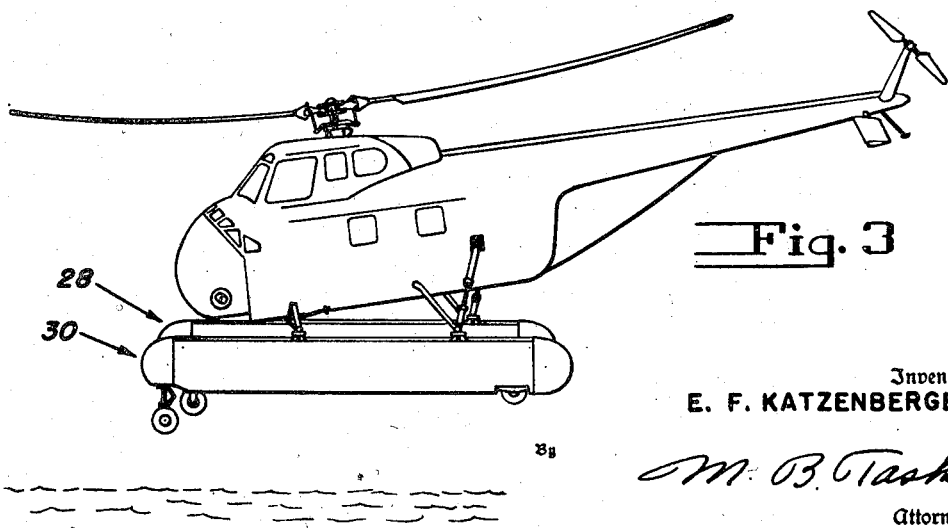
Fig. 3 shows the helicopter airborne and in forward flight.

It will be evident that when the helicopter is resting on the ground or on the water as shown in Fig. 1, the weight of the helicopter will cause the oleo strut 152 to be compressed during which the shock of a hard landing will be absorbed. As the helicopter rides in rough water the oleo action will also absorb some of the motion due to the swells and will allow the rotor shaft to remain substantially perpendicular to the surface of the water. Likewise much of the difficulty of landing a float-equipped helicopter in choppy water is eliminated by the presence of these oleo struts. In taking off from either land or water, as the weight of the helicopter is removed from the oleo struts, they extend into the position shown in Fig. 2, allowing the aft portions of the floats to drop as the latter pivot around the spindles 72 of their forward mounts. The extension of the oleo struts in their unloaded condition is arranged to be such that in the normal forward flight of the helicopter, in which the rotor shaft axis as well as the tip path plane of the blades is inclined somewhat forwardly, the floats are carried in substantially horizontal or parallel relationship to the relative wind as is illustrated in Fig. 3 thus eliminating a severe nose down pitching moment which would otherwise occur if the floats were carried rigidly by the fuselage at an angle to the relative wind. This greatly reduces float drag, and also avoids the difficult control problems which arise upon substantial changes of the pitching moment of the airframe due to the depending floats.

It will thus be evident that as a result of this invention an undercarriage structure has been provided for a helicopter or other direct lift aircraft which enables the helicopter to land safely in rough and choppy water. Further, it will be evident that an amphibious landing gearing for a helicopter has been provided which very materially reduces the float drag in forward flight.

While only one embodiment of the invention has been shown and described herein it will be evident that various changes in the construction and arrangement of the parts may be resorted to without departing from the scope of the invention.

I claim:

1. In a helicopter having a fuselage and a sustaining rotor mounted over said fuselage, a pair of floats disposed longitudinally of said fuselage on opposite sides thereof, means including front and rear mounts for connecting said fuselage to each of said floats, said front mounts each including a generally transverse pivot carried by said fuselage for supporting a float for pivotal movement in a vertical plane including the longitudinal axis of the float and linkage means having one end supported in said fuselage for supporting said transverse pivot for a limited fore and aft movement, and said rear mounts each including an arm having one end supported in said fuselage for movement about a transverse axis and having its other end pivotally connected with a float for movement about an axis parallel with said transverse axis, and extensible and contractable oleo strut means located aft of said front mounts and connecting said fuselage and said floats having resilient means constantly biasing said strut means into their extended position in which said floats occupy a nose-up attitude with respect to said fuselage.

2. In a direct lift aircraft, a fuselage, a main landing gear including a strut member having a horizontal inboard portion pivoted in said fuselage and having a wheel axle at its outboard end which is parallel with said inboard portion, and an oleo strut connecting the outboard end of said strut member and said fuselage, elongated float means pivotally mounted on said axle aft of the mid point of said float means, and means for pivotally connecting said float means to said fuselage forward of said mid point on vertical and horizontal pivots, whereby said float means is free to move fore and aft relative to said fuselage as said oleo strut extends and retracts.

3. In a direct lift aircraft having an elongated fuselage, said aircraft being of the type which flies in a nose down attitude in forward flight, a pair of elongated floats located side-by-side below said fuselage, means for connecting said fuselage and said floats at forward and aft locations, the forward connection comprising both vertical and transverse pivotal supports and the aft connection comprising an extensible connection between said floats and said fuselage, said extensible connection being free to extend under the weight of said floats whereby said fuselage and said floats occupy a generally parallel relationship when the weight of the fuselage is on said floats and an acute angled relationship in which the floats are aligned with the relative wind when the aircraft is in flight.

References Cited in the file of this patent

UNITED STATES PATENTS

| 1,600,154 | Van Vliet | Sept. 14, 1926 |
| 1,682,894 | Cierva | Sept. 4, 1928 |
| 1,943,783 | Belanca | Jan. 16, 1934 |
| 1,963,630 | Procofieff | June 19, 1934 |
| 1,977,724 | Hays | Oct. 23, 1934 |
| 2,007,752 | Seversky | July 9, 1935 |
| 2,302,343 | Noorduyn | Nov. 17, 1942 |
| 2,396,189 | Millar | Mar. 5, 1946 |
| 2,439,196 | Wolf | Apr. 6, 1948 |
| 2,574,404 | Lucien | Nov. 6, 1951 |

FOREIGN PATENTS

| 18,476 | Great Britain | of 1913 |
| 372,082 | Great Britain | May 5, 1932 |